United States Patent [19]

Baumüller

[11] Patent Number: 5,097,811

[45] Date of Patent: Mar. 24, 1992

[54] PROCESS FOR OPERATING A TWO-STROKE INTERNAL COMBUSTION ENGINE

[75] Inventor: Andreas Baumüller, Munich, Fed. Rep. of Germany

[73] Assignee: Ficht GmbH, Kirchseeon, Fed. Rep. of Germany

[21] Appl. No.: 585,128

[22] PCT Filed: Apr. 5, 1989

[86] PCT No.: PCT/EP89/00366

§ 371 Date: Oct. 2, 1990

§ 102(e) Date: Oct. 2, 1990

[87] PCT Pub. No.: WO89/09872

PCT Pub. Date: Oct. 19, 1989

[30] Foreign Application Priority Data

Apr. 6, 1988 [DE] Fed. Rep. of Germany ....... 3811553

[51] Int. Cl.$^5$ .................... F02D 17/02; F02D 3/00; F02M 69/10; F02B 1/10
[52] U.S. Cl. .................... 123/481; 123/73 C
[58] Field of Search ............... 123/73 A, 73 C, 198 F, 123/295, 481, 305

[56] References Cited

U.S. PATENT DOCUMENTS

| | | | |
|---|---|---|---|
| 2,018,426 | 10/1935 | Taber | 123/124 |
| 2,771,867 | 11/1956 | Peras | 123/481 |
| 4,509,488 | 4/1985 | Forster et al. | 123/198 F |
| 4,768,474 | 9/1988 | Fujimoto et al. | 123/481 |
| 4,991,558 | 2/1991 | Daly et al. | 123/481 |

FOREIGN PATENT DOCUMENTS 913835 5/1954 Fed. Rep. of Germany .

*Primary Examiner*—Tony M. Argenbright
*Attorney, Agent, or Firm*—Nixon & Vanderhye

[57] ABSTRACT

When a two-stroke combustion engine (10) runs in the no-load or underload mode with intermittent fuel injection, besides the injection nozzles (12) being activated intermittently, the throttle (18) is opened more than is usual on transition into the no-load or underload mode and the fuel is simultaneously injected at a constant angle of aperture and flow. The process ensures reliable ignition of a weak mixture in the no-load or coasting mode; thus the energy consumption and exhaust production are limited in these modes and the engine runs in a cost-effective manner.

7 Claims, 2 Drawing Sheets

PROCESS FOR OPERATING A TWO-STROKE INTERNAL COMBUSTION ENGINE

The invention relates to a process for operating a two-stroke internal combustion engine with an electronically controlled direct injection of the fuel into the cylinder, wherein the fuel injection is performed intermittently in the no-load and in the lower underload mode.

For two-stroke Otto engines it is known that by forming a mixture within the cylinder, i.e. by a fuel injection after the closing of the exhaust channels, the consumption values and the HC proportions in the exhaust gas can substantially be improved. By such a direct injection of the fuel a layering of the loading in the interior of the cylinder can be obtained in that, namely, the fuel is injected by means of the injection nozzle into defined areas of the cylinder and thus, in the moment of ignition, is in the region of the spark. However, it has been found that in the lower underload mode, in the thrust mode as well as in the no-load mode there are still ignition irregularities, which in these modes are assumed to result from the high proportion of old gas in the cylinder. It is assumed that the reason for this is that the fuel, although being injected into the correct area, does not mix sufficiently up to the moment of ignition within the large amount of old gas to form an explosive mixture with the fresh air introduced in relatively small amounts due to the throttle being closed in the underload, thrust and no-load modes. Only after several gas changes have occurred, the old gas is dislodged by fresh air such that the injected fuel can burn.

In DE-PS 913 835 this phenomenon of the no longer regular ignition is discussed and it is assumed that the cylinders of the two-stroke Otto engine are supplied with a too weak mixture and that therefrom the ignition difficulties result. For removing these difficulties it is suggested at the change-over from full load mode to underload mode to proceed from a control with diminishing gas pressure with a constant opening time of the injection valves to a control with increased constant gas pressure with reduced opening times of the injection valves. Thereby, the fuel supply to the cylinders is performed intermittently, and this only at each second third, fourth or fifth revolution or cycle. By this intermittent fuel supply the capability of the mixture to ignite is improved by the twofold repeated supply of fresh air between the injection intervals. These improvements by the intermittent operation are only possible by a comparatively high expenditure, because two control pumps are required, one of which is provided with a sloping edge control. The described design permits only an injection at each second cycle; it must be questioned whether thereby already a reliable ignition can be achieved.

From the journal "Kraftfahrzeugtechnik", Berlin 35 (1985), volume 7, pages 201 to 203, there is also known a two-stroke Otto engine with intermittent injection in the underload mode. By means of control electronics the amount of fuel as well as the moment in time are determined at which this amount of fuel is injected into the cylinder. For this a special pump-nozzle-system is being used. Thereby, the consumption and the exhaust gas values shall be improved.

The invention, thus, is based on the problem to provide a two-stroke combustion engine in which—particularly in the underload mode as well as in the no-load and the thrust modes—good circulation or running properties and a low underload consumption are guaranteed as well as increased requirements for low exhaust gas values can safely be obtained.

The inventive solution of this problem is to be seen in that there is provided a process for operating a two-stroke combustion engine with an electronically controlled direct fuel injection into the cylinder, wherein the fuel injection in the no-load and the lower underload mode is performed intermittently, characterized in that the electronic control for the intermittent operation of the injection nozzle additionally opens the throttle beyond the no-load or underload condition in order to supply a larger amount of fresh air, and the fuel is injected during a load-depending but constant rotational angle with a constant fuel volume flow.

By the features of the invention it is achieved in advantageous manner that by opening the throttle beyond the position common for the no-load and the underload condition, respectively, a larger amount of fresh air is supplied, which insures the ignition of smallest amounts of fuel injected during the intermittent mode, whereby a lean combustion with a perfect circulating operation is guaranteed, because the ignition conditions for one performed injection are already insured after relatively few revolutions without injection. Since the injection is made at a constant rotational angle or angle of aperture with a constant volume flow, in the no-load mode a drifting-off of the number of revolutions is balanced, because a change of the number of revolutions is automatically associated with an opposite change of the injected fuel volume. Further, spark failures due to a wrong layering of the mixture in the cylinder are safely avoided.

It is also proposed that the throttle is completely opened during the no-load and underload conditions, respectively, in order to obtain a layering of the loading which in the moment of ignition brings the inflammable mixture near to the spark and, depending on the load condition, keeps more or less proportions of the pure fresh air in regions remote from the spark. In spite of the full opening of the throttle, a regulation of the number of revolutions is not necessary in the no-load mode, since by the injection of the fuel with constant volume flow during a constant angle of aperture a drifting-off of the number of revolutions is automatically regulated.

However, in order to make possible a capacity regulation also in the underload mode, it is further suggested that for adjusting a desired engine capacity the rotational angle of aperture or injection is altered, but then kept constant irrespective of the number of revolutions of the engine.

In order to make certain the injection with a constant volume flow in all operating conditions, the inventive method proposes that the fuel be injected with a pressure of about 30 bar or more directly into the cylinder. By this increased injection pressure the atomization is improved and thus, the formation of the mixture is made possible within a shorter time period.

Preferably, the duration of each injection is in the order of approximately 1 ms. Such control can be realized very exactly, because exactly working injection nozzles are available in the prior art, and the adjustment of the aperture angle can easily be performed by means of angle indicators arranged on the crankshaft.

In multiple-cylinder two-stroke engines the fuel injection for the individual cylinders can be performed sequentially and periodically in equal time intervals, so that all cylinders can be switched off or can ignite in series. In a four-cylinder radial type engine with a cylinder angle of 90° and an ignition distance of 90° (cylinder sequence 1, 2, 3, 4) one can, for example, let the injection sequence rotate opposite to the ignition sequence. Starting from cylinder no. 1, thus, fuel is injected after ¾ motor revolutions only into the cylinder no. 4, after 1½ revolutions into the cylinder no. 3, after 2¼ revolutions into the cylinder no. 2 and after 3 revolutions again into the cylinder no. 1. Hereby, the fuel is injected only at each third revolution into one of the four cylinders one after the other. Thereby, a uniform ignition sequence in equal time intervals and a uniform rotation or circulation result.

The invention with its advantages and features will be explained also in the following description of an embodiment in connection with the claims and the drawing.

Figure 1:
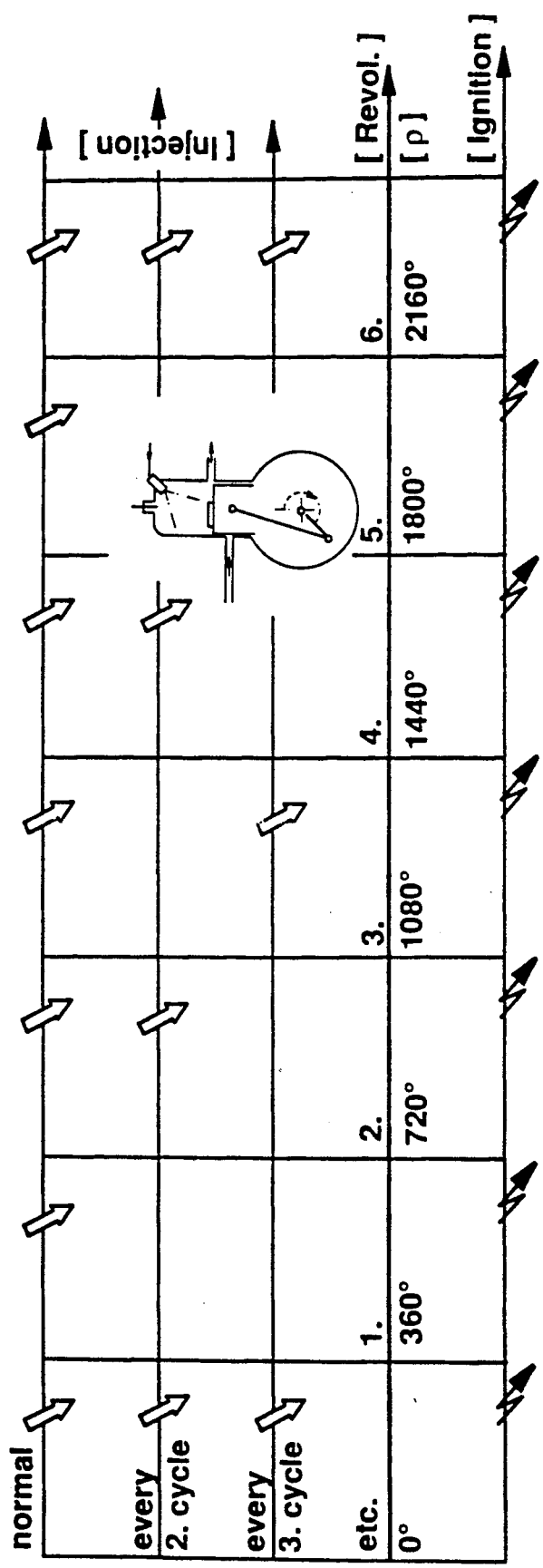
FIG. 1 shows a diagram for a normal and intermittent direct injection in a two-stroke engine.

In the diagram according to FIG. 1, in the lower portion the ignitions of the spark performed at each revolution of the engine and at the corresponding rotational angular positions (θ) are illustrated. In the upper part of the diagram the injections are indicated, wherein in the first line the normal injection prior to each ignition, i.e. at each revolution of the engine is shown.

In the second and third lines of the diagram the periodically interrupted injections are illustrated. In the course of the injection illustrated in the second line a periodically intermittent fuel injection is performed only at each second engine revolution or cycle. With the example illustrated in the third line a periodically intermittent fuel injection is performed only with each third engine revolution or cycle. In a corresponding manner a fuel injection could be performed only with each fourth, fifth etc. engine revolution or cycle.

Figure 2:
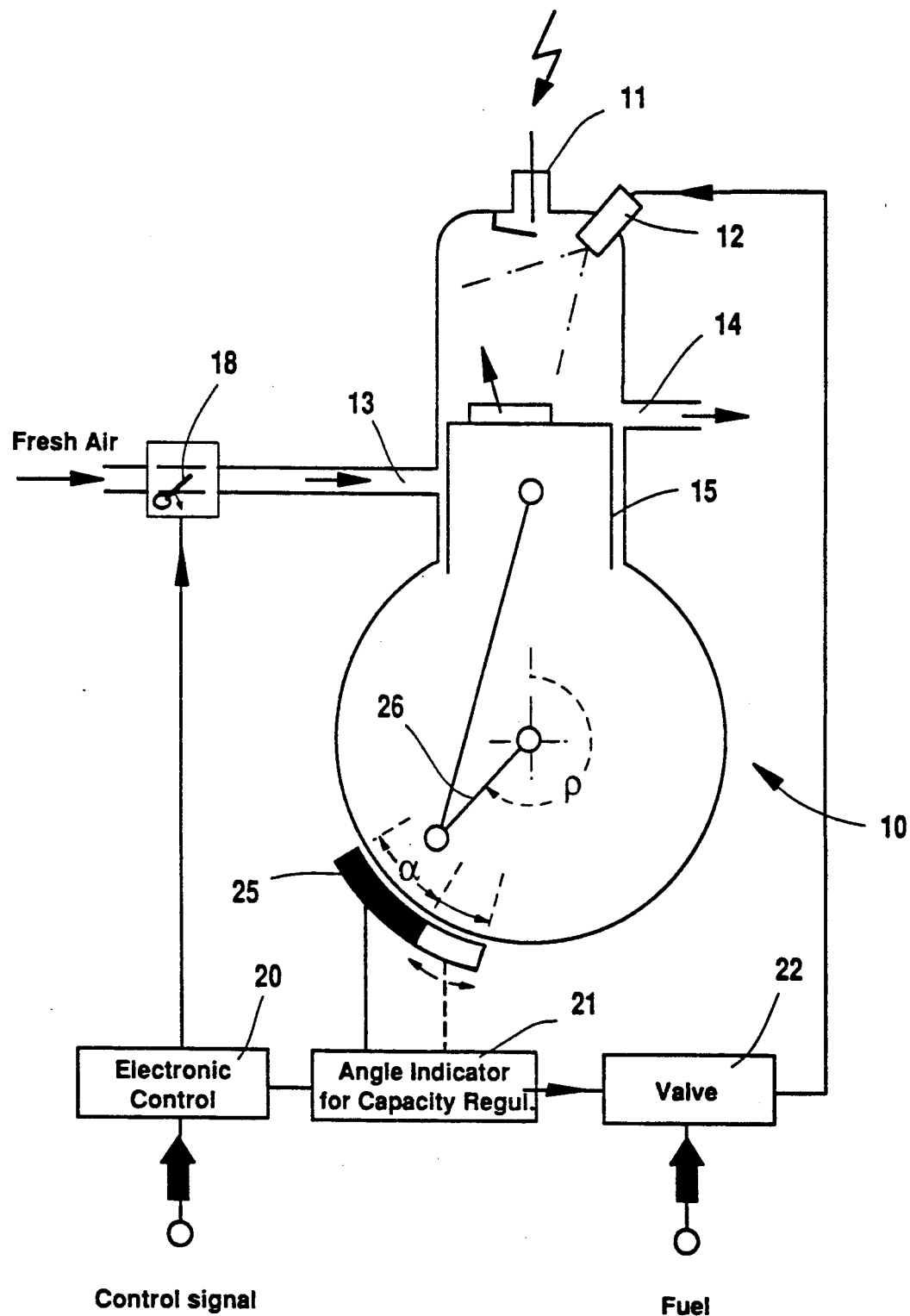
FIG. 2 shows a schematic representation of a circuitry for performing the method according to the invention.

In the illustration according to FIG. 2 there is schematically shown a two-stroke combustion engine 10. The spark 11 ignites at each revolution of the engine. At the cylinder head an injection nozzle 12 is provided which injects the fuel periodically into the cylinder space in equal time intervals intermittently as desired at each individual, each second, each third, each fourth etc. revolution. This injection is performed shortly after the closing of the intake channel 13 and the exhaust channel 14, and shortly before the piston 15 reaches the upper dead center as well as prior to the moment of ignition. In the fresh air conduit leading to the intake channel 13 a throttle member with a throttle valve 18 is provided. This throttle member is connected with an electronic control 20 which is fed with a control signal serving for controlling the engine during operation. The electronic control is connected with an angle indicator 21 for the capacity regulation, which inturn acts onto a valve 22 for the fuel injection. This valve 22 is directly connected with the injection nozzle 12 and supplies the injection nozzle with the fuel in a constant volume flow under high pressure, for example with a pressure of 30 bar or more.

The angle indicator for the capacity regulation 21 comprises one or more sensors 25 associated with the crankshaft 26 of the engine and detecting a pre-determined rotational angle α per each revolution. During this rotational angle the valve 22 is activated and opened for the fuel supply towards the injection nozzle 12. Since the fuel is supplied with a constant volume flow, this releases with a constant number of revolutions during the rotational angle α (also named opening angle α in the following) the injection of a constant fuel volume. If the number of revolutions changes—particularly during the no-load or the thrust mode—, i.e. if the number of revolutions drifts off, also the time period will change during which the rotational angle α is passed, and this occurs in a manner oppositely proportional to the number of revolutions. Thereby a self-regulation for the number of revolutions results in that, if the number of revolutions increases the amount of injected fuel decreases or when the number of revolutions decreases the time period of fuel injection increases and thus, the amount of fuel injected with a constant volume flow increases.

In order to guarantee according to the invention a safe ignition with a mixture as weak or lean as possible, simultaneously with the change-over into the no-load or underload mode the throttle valve 18 is opened by means of the electronic control 20. This results in a plentiful supply of fresh air during the intermittent fuel injection. By the larger amount of supplied fresh air a safe ignition is guaranteed. Additionally, however, the injection can be made also more often in smaller amounts, which in spite of the intermittent injection has the result that the engine obtains a very smooth circulating running.

In order to reduce the amount to be injected it is, therefore, proposed that the sensors 25 by which the rotational angle or angle of aperture α is detected, permit an angular adjustment. This adjustment of the angle can also be used for a regulation of the capacity or output in the underload mode with opened throttle valve. By the plentiful offering of fresh air it is guaranteed that a layering of the charge is obtained at which always an inflammable mixture collects near the spark at the moment of ignition and, according to the load condition, also a more or less large proportion of fresh air in the region remote from the spark. By this measure a regulation of the load condition by the injection amount alone becomes possible also in the no-load and underload modes, whereby always plenty of fresh air is present in order to insure in the underload mode a lean combustion, wherefrom the especially favourable exhaust gas values and consumption values result for a two-stroke combustion engine operated according to the method of the invention.

I claim:

1. Process for operating a two-stroke combustion engine with an electronically controlled direct fuel injection into the cylinder, wherein the fuel injection in the no-load and the lower underload mode is performed intermittently, characterized in that the electronic control for the intermittent operation of the injection nozzle additionally opens the throttle beyond the no-load or underload condition in order to supply a larger amount of fresh air, and the fuel is injected during a load-depending but constant rotational angle with a constant fuel volume flow.

2. Process according to claim 1, characterized in that the throttle is completely opened in the no-load or the underload mode.

3. Process according to claim 1, characterized in that the injection of the fuel during a constant rotational angle is controlled by an angle indicator responsive to the crankshaft position.

4. Process according to claim 1, characterized in that for adjusting a desired engine capacity the rotational angle is changed and then kept constant irrespective of the number of revolutions of said engine.

5. Process according to claim 1, characterized in that the injection pressure amounts to at least approximately 30 bar.

6. Process according to claim 1, characterized in that the electronically controlled fuel injection is performed with a duration of each injection in the order of 1 ms.

7. Process according to claim 1, characterized in that in a two-stroke combustion engine having multiple cylinders the fuel injection for the individual cylinders is performed sequentially and periodically in equal time intervals.

* * * * *